United States Patent
Crotti et al.

(10) Patent No.: US 7,852,775 B2
(45) Date of Patent: Dec. 14, 2010

(54) METHOD FOR DETERMINING IF AN ENCRYPTED FLOW OF PACKETS BELONGS TO A PREDEFINED CLASS OF FLOWS

(75) Inventors: Manuel Crotti, Mazzano (IT); Maurizio Dusi, Gadesco Pieve Delmona (IT); Francesco Gringoli, Brescia (IT); Luca Salgarelli, Besana in Brianza (IT)

(73) Assignee: Universita Degli Studi Di Brescia (IT)

( * ) Notice: Subject to any disclaimer, the term of this patent is extended or adjusted under 35 U.S.C. 154(b) by 179 days.

(21) Appl. No.: 12/369,248

(22) Filed: Feb. 11, 2009

(65) Prior Publication Data
US 2009/0207740 A1 Aug. 20, 2009

(30) Foreign Application Priority Data
Feb. 11, 2008 (EP) .................................. 08425077

(51) Int. Cl.
H04L 12/26 (2006.01)
(52) U.S. Cl. ....................................... 370/241; 713/151
(58) Field of Classification Search ................. 370/241, 370/252, 253, 401; 709/223–229; 713/187–194; 726/22–25
See application file for complete search history.

(56) References Cited
U.S. PATENT DOCUMENTS
7,448,084 B1 * 11/2008 Apap et al. .................. 726/24

2005/0249125 A1 * 11/2005 Yoon et al. .................. 370/252

OTHER PUBLICATIONS
Crotti et al., "Detecting HTTP Tunnels with Statistical Mechanism," IEEE Communications, Jun. 1, 2007, pp. 6162-6168.
European Search Report dated Nov. 20, 2008 for EP Application No. 08425077.8.

* cited by examiner

*Primary Examiner*—Ricky Ngo
*Assistant Examiner*—Gary Mui
(74) *Attorney, Agent, or Firm*—Jonathan D. Ball; King & Spalding LLP

(57) ABSTRACT

A method to determine if an encrypted flow of packets (F) belongs to a predefined class of flows ($\omega_t$), comprises the steps of giving probability density functions ($p(x_i|\omega_t)$) of the values of two measurable variables in a plurality of encrypted flows of packets ($F_j$) belonging to the predefined class of flows ($\omega_t$), measuring the values ($s_i, \Delta t_1$) of the two measurable variables, apply the measured values ($s_i, \Delta t_1$) to the probability density functions ($p(x_i|\omega_t)$) to generate a sequence of values of probability density ($p(\vec{x}|\omega_t)$), process the sequence of values of probability density ($p(\vec{x}|\omega_t)$) to generate a reference value ($S(\vec{x}|\omega_t)$), and compare such reference value ($S(\vec{x}|\omega_t)$) to a threshold value (T) to determine whether the encrypted flow of packets (F) belongs to the predefined class of flows.

12 Claims, 1 Drawing Sheet

METHOD FOR DETERMINING IF AN ENCRYPTED FLOW OF PACKETS BELONGS TO A PREDEFINED CLASS OF FLOWS

This application claims priority under 35 U.S.C. §119(a) to European Patent Application No. 08425077.8, filed Feb. 11, 2008, the contents of which are hereby incorporated by reference in their entirety.

FIELD OF THE INVENTION

The present invention refers to a method to determine if an encrypted flow of packets belongs to a predefined class of flows.

BACKGROUND OF THE INVENTION

The majority of local area networks today enforce security policies to control the traffic that crosses their boundaries. Security policies are usually implemented by combining two types of devices, firewalls and Application Level Gateways (ALGs). A very common setup is to have a firewall that allows only traffic that cross the ALG and leave the task of traffic control to the ALG. The ALG verifies through a thorough classification based analysis that the traffic that cross the network boundaries obeys the policies.

Through the recent years, however, the safety that can be guaranteed by this kind of devices is dramatically diminishing. Several factors are contributing to this trend: an example is given by the emergence of masquerading techniques that tunnel forbidden application protocols inside those that are allowed by the policies.

A solution to detect when the HTTP protocol is used to tunnel other application protocols on top of it, is reported in the paper by M. Crotti, M. Dusi, F. Gringoli, and L. Salgarelli titled "Detecting HTTP Tunnels with Statistical Mechanism" and published in the "Proceedings of the 42th IEEE International Conference on Communications" (ICC 2007), Glasgow, Scotland, June 2007.

Although effective for the HTTP protocol, the solution described in this paper is totally ineffective toward tunneling mechanisms that use encryption such as those that can be set up between any pair of Secure Shell client and server peers. These tunnels can be used to protect by means of cryptographic techniques any traffic stream flowing between a SSH client, the tunnel entry point, and a SSH server, the tunnel exit point: the resulting stream is not distinguishable from normal SSH traffic by the classifiers used within ALGs.

The SSH protocol is typically used to exchange traffic between a pair of peers on a secure connection when the network is not secure.

While in the case of HTTP tunnels, advanced ALG devices could analyze what is actually carried on top of the HTTP protocol, the same analysis can not be accomplished if the tunneling protocol encrypts the exchanged information.

From the above it follows an increasing need for a method that can determine whether or not an encrypted flow of packets belongs to a predefined class of flows, identifying for example non-legitimate activities such as tunnel activities over SSH, so as to avoid lock of flows belonging to this predefined class and to possibly block the encrypted flow not belonging to this predefined class.

SUMMARY OF THE INVENTION

The scope of the present invention is to provide a method to determine if an encrypted flow of packets belongs to a predefined class of flows in accordance with the requirements described above and being able to get around the described impairments as reported in the prior art.

This scope is achieved by a method to determine if an encrypted flow of packets belongs to a predefined class of flows.

According to a further aspect, this scope is achieved by an apparatus to determine if an encrypted flow of packets belongs to a predefined class of flows.

Thanks to the present invention, it is possible to determine with very high accuracy if an analyzed encrypted flow of packets belongs to a predefined class of flows and with the same accuracy if the encrypted flow of packets is used for tunneling activities given that the usage context characterized by the predefined class of flows is a tunneling context.

Other features and benefit offered by the method to determine the class membership of an encrypted flow of packets according to the present invention will be reported in the following together with an example of the preferred embodiment of this invention, given as an example and in a non-binding way, referring to the enclosed figures.

DETAILED DESCRIPTION

Figure 1:
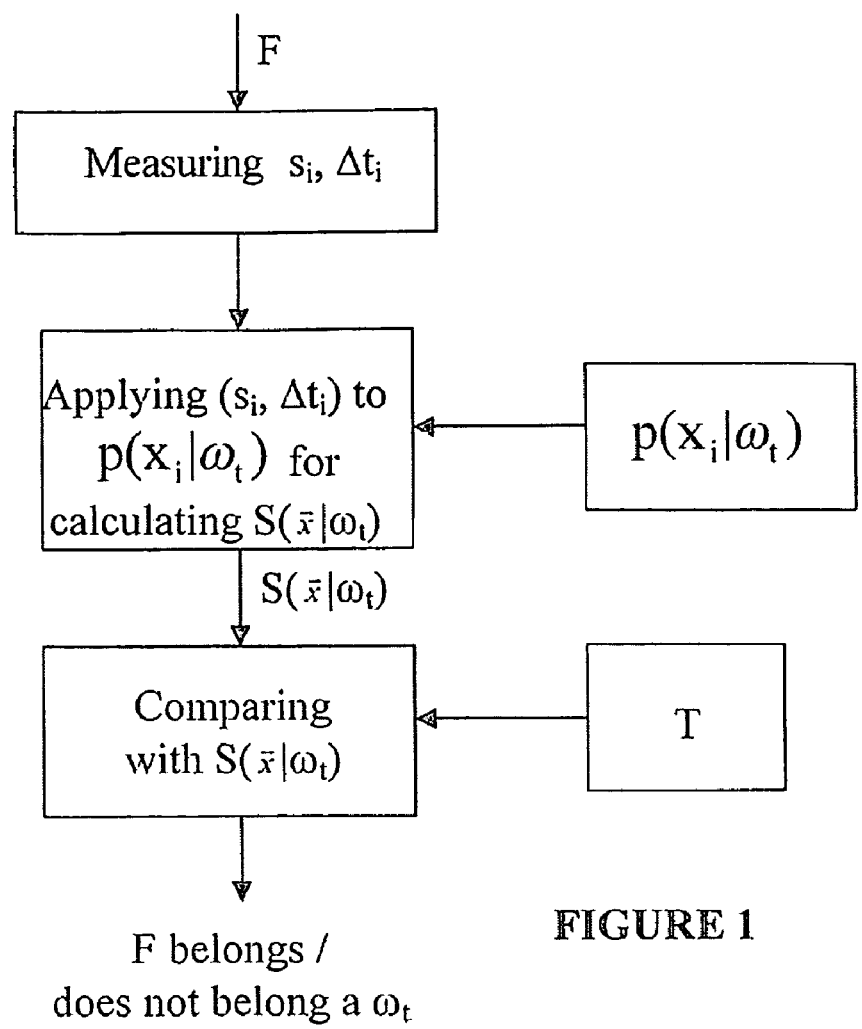
FIG. 1 is an outline of the method to determine if an encrypted flow of packets belongs to a predefined class of flows according to the present invention.

In the following of the present invention, the concept of probability density function will be used within the context of statistical pattern recognition methodologies. To provide a framework for the presented technique, here the basics of pattern recognition theory are introduced.

Three main definitions are the basis of statistical pattern recognition: pattern, feature and class. The pattern is an r-dimensional vector of measurements $\vec{x} = (x_1, x_2, \ldots, x_r)$, whose components $x_i$ measure the features of an object, that means the value of one or more directly quantifiable variables associated to the object. The concept of class is used in discrimination: assuming a plurality of C classes named $\omega_1, \ldots \omega_C$, each pattern $\vec{x}$ will be associated with a variable that denotes its class membership.

In the case of the present invention, classes are gathered from an a priori training set composed of flows belonging to one or more chosen classes. Given a set of data and a set of features, the goal of a pattern recognition technique is to represent each element as a pattern, and to assign the pattern to the class that best describes it, according to chosen criteria.

In the following it is described a method to determine if an encrypted flow of packets F belongs to a predefined flow class $\omega_t$.

According to one embodiment, the predefined flow class $\omega_t$ identifies legitimate activities and hence represents the class of flows that must be accepted. It follows that it is possible to define a complementary class $\omega_{\bar{t}}$ that identifies not legitimate activities, such as those which involve tunneling traffic, and hence represents the class of flows that must not be accepted or equivalently blocked; all of the above require that $C = \omega_t \cup \omega_{\bar{t}}$, and $\omega_t \cap \omega_{\bar{t}} = \emptyset$.

In the following the term packet flow F represent an ordered sequence of N+1 packets $Pkt_i$ composed of packets used to accomplish the authentication step, and of packets used to exchange information. Here variable i varies in i=0 . . . N, where the i-th packet $Pkt_i$ represents a packet generated by the client toward the server (or viceversa), and N+1 is the number of packets that compose the packet flow F. Please note that in the case of transport protocols such as the Transmission Control Protocol (TCP) that rely on signaling mechanisms, the method should not be applied to those packets that contain only signaling information.

Each packet $Pkt_i$ can be represented by at least two measurable variables, i.e. the pair of measurable variables $(s,\Delta t)$, so that the flow can be defined by the ordered sequence of pairs $s_i,\Delta t_i$ given by the at least two measurable variables $s_i,\Delta t_i$.

According to the embodiment described in the following, $s_i$ represents the length of packet $Pkt_i$ and $\Delta t_i$ is the inter arrival time between the reception of two consecutive packets $Pkt_{i-1}$ and $Pkt_i$.

The method to determine if the encrypted flow of packets F belongs to the predefined flow class $\omega_t$, comprises a first step a) of providing, for each i-th packet position in an ordered sequence of packets $Pkt_i$, a probability density function $p(x_i|\omega_t)$ of the values of the two measurable variables in a plurality of encrypted flows of packets $F_j$ belonging to the predefined flow class $\omega_t$, where $x_i=(s_i,\Delta t_i)$.

Class $\omega_t$ can represent flows generated by legitimate activities. It should be noted that the flows class $\omega_t$ might be associated to legitimate activities to be determined with respect to illegitimate activities which can be associated to the complementary class $\omega_r$.

In particular, step a) comprises the following steps:

a1) providing a plurality of encrypted flows of packets $F_j$ belonging to the predefined flow class $\omega_t$, a2) measuring, for each i-th packet in an ordered sequence of packets $Pkt_i$, the values of the two measurable variables $s_i,\Delta t_i$, in each of the flows $F_j$ of the plurality of encrypted flows of packets belonging to the predefined flow class $\omega_t$, and a3) processing, for each i-th packet position, the measured values $s_i,\Delta t_i$ to generate the probability density function $p(x_i|\omega_t)$ for each i-th packet position.

According to one embodiment, step a3) comprises, for each i-th packet position, the steps of:

a31) processing the measured values $s_i,\Delta t_i$ to generate a first probability density function $p(x_i|\omega_t)$, a32) applying a kernel $k(s,\Delta t)$ to this first probability density function $p(x_i|\omega_t)$ to generate a filtered function $p_f(x_i|\omega_t)$, and a33) normalize the filtered function $p_f(x_i|\omega_t)$ to generate the probability density function $M_r(s_i,\Delta t_i)$.

The adopted kernel k has to be chosen to optimize the results that can be obtained by the subsequent classification of the packet flow F. Examples of functions that can be used as kernels are the Gaussian function and the Hyperbolic Secant function respectively defined as:

$$k(s_i, \Delta t_i) = e^{-\frac{(s_i^2+\Delta t_i^2)}{M^2}}$$

$$k(s_i, \Delta t_i) = \mathrm{sech}\left(\frac{\sqrt{s_i^2+\Delta t_i^2}}{M}\right)$$

It should be noted also that the normalization of the probability density functions $p_f(x_i|\omega_t)$ obtained by applying the kernel k has to be performed keeping unaltered the range of values which the observable variables may assume.

Afterwards, the method involves the following steps:

b) measuring, for each packet of a plurality of L packets $Pkt_i$ of encrypted flow of packets F, the values $s_i,\Delta t_i$ of the two measurable variables $s,\Delta t$, where i=1 . . . L, c) applying, for each i-th packet $Pkt_i$ of the plurality of packets of the encrypted flow of packets F, the measured values $s_i,\Delta t_i$ to the probability density function $M_r(s_i,\Delta t_i)$ of the respective position of packet i to generate a sequence of values of probability density $M_r(s_i,\Delta t_i)$, d) processing the sequence of values of probability density to generate a reference value $S(\vec{x}|\omega_t)$, and e) comparing this reference value $S(\vec{x}|\omega_t)$ to a threshold value T to determine if the encrypted flow of packets F belongs to the predefined flow class $\omega_t$.

It should be noted that steps b) and c) must be applied to a predefined number of consecutive packets, all following a predetermined packet no chosen in such a way that steps b) and c) are applied exclusively to those packets of the encrypted flow of packets that carry data, hence excluding both signaling packets and authentication packets.

According to one embodiment of this invention, when the reference value $S(\vec{x}|\omega_t)$ is lower than the threshold value T, the encrypted flow of packets F is determined as belonging to the predefined flow class $\omega_t$: if, instead, the reference value $S(\vec{x}|\omega_t)$ is greater than the threshold value T, the encrypted flow of packets F is determined to belong to the complementary class $\omega_r$.

The method described in the present invention can be especially deployed to discover illegitimate activities, when the predefined flow class $\omega_t$ describes legitimate flows and the complementary class $\omega_r$ characterizes illegitimate flows.

In this case, the method permits to establish if flow F can be assigned to the predefined flow class $\omega_t$. Since the predefined flow class $\omega_t$ defines an acceptance region that is complementary to the rejection one defined by the complementary flow class $\omega_r$, every flow F that does not belong to the predefined flow class $\omega_t$ is classified as a flow that belongs to the complementary flow class $\omega_r$ which defined the rejection region.

In the following of the present description, we will refer, in a non binding way, to a flow F over the SSH protocol, defined by a sequence of N pairs $P_i=(s_i,\Delta t_i)$ of the two measurable variables $s,\Delta t$, with $1 \leq i \leq N$, where $s_i$ represents the size of packet $Pkt_i$ and $\Delta t_i$ represents the time interval between receiving two consecutive packets $Pkt_{i-1}$ and $Pkt_i$.

A flow is hence represented by a pair of patterns $\vec{x}$, one for each of the two directions. In the following example, $$\vec{x} = \begin{pmatrix} s_1 & \cdots & s_r \\ \log_{10}[\Delta t_1] & \cdots & \log_{10}[\Delta t_r] \end{pmatrix}$$

where r is the number of packets composing the flow excluding the first, as the first value $\Delta t$ can be measured only after having analyzed the second packet $Pkt_1$.

To determine if a SSH flow is carrying tunneling activity, it should be determined if the flow F under analysis has been generated by illegitimate activities, such as tunneling ones, or if the SSH protocol is being used for legitimate purposes, such as remote access or secure file copy. In this case, the method supplies the characterization of only one class, in the example the class of legitimate SSH flows corresponding to the predefined flow class $\omega_t$.

The generation of the probability density functions $p(x_i|\omega_t)$ is based on the analysis of a plurality of Z probability density functions generated by Z SSH flows that do not carry tunnel activities, that is Z SSH flows that belong to class $\omega_t$.

The i-th function $p(x_i|\omega_t)$ is generated from the i-th pairs $s_i, \Delta t_i$ belonging to the flows having at least i+1 packets. Hence each function $p(x_i|\omega_t)$ describes the behavior of the i-th packets in the domain of variables $s, \Delta t$.

The value of a pair $s_i, \Delta t_i$ of an i-th packet of a SSH flow F applied to the probability density function $P(x_i|\omega_t)$ gives the correlation between the unknown flow F and the probability density function. The bigger is the value of the probability density function in point $s_i, \Delta t_i$, the greater is the probability that the unknown flow F has been generated by the SSH protocol.

To take into account the noise that the network can introduce on the measured variables, a kernel is applied, e.g. the Gaussian kernel said above, to the Z functions $p_j(x_i, \omega_t)$ and these functions are then normalized to obtain the corresponding Z functions $M_t(s_i, \Delta t_i)$.

In practice, given a plurality Z of flows $F_j$ generated by the SSH protocol, that means flows that belong to class $\omega_t$, these flows are converted into their equivalent pattern representation.

According to one embodiment of the present invention, since the samples are at our disposal, the histogram method can be used. This method partitions the r-dimensional space of class $\omega_t$ into a number of equally-sized cells and estimates the probability density $p(\vec{x})$ at a point $\vec{x}$ as follows:

$$p(\vec{x}) = \frac{n_j}{\sum j \in N_j^n dV}$$

where $n_j$ represents the number of samples in cell of volume dV that straddles point $\vec{x}$, N represents the number of cells, and dV is the volume of the cells.

To reduce the complexity of the resulting matrix, one can suppose that consecutive pairs $s, \Delta t$ are independent; the complexity is hence reduced to rN cells.

In this case, the probability density functions are defined as follows:

$$p(\vec{x}|\omega_t) = \prod_{k=1}^{r} p(x_k|\omega_t),$$

where $p(x_k|\omega_k)$ is the one-dimensional probability density function of the components $\vec{x}$ with respect to class $\omega_t$.

The length of the pattern can then be limited to L elements: it follows that each SSH flow contributes to the estimation of a number of probability density functions given by min(r,L), where r is the length of the sequence composed of all the pairs $s, \Delta t$.

With the availability of the probability density functions $p(x_i|\omega_t)$ of the values of the two measurable variables $s, \Delta t$ for each packet position i, the values $s_i, \Delta t_i$ of the two measurable variables for each packet of the encrypted flow of packets F can be measured.

As said above, the measure is determined starting from a predetermined packet $n_0$.

It should be taken into account, in fact, that a SSH flow is made of packets that carry authentication information and packets that carry application data: it follows that the measures of the values of the measurable variables and their application to the probability density functions must not be performed on authentication packets but only on data packets. Similarly all packets that carry only transport layer signaling should be excluded from the measures.

To this end, as anticipated above, steps b) and c) of the method are applied to a predefined number of consecutive packets that follow the predetermined packet $n_0$. Packet $n_0$ is chosen to avoid the application of the method to the authentication packets of the flow F.

Afterwards the measured values $s_i, \Delta t_i$ are applied to the probability density function $p(x_i|\omega_t)$ of the respective packet position i to generate a sequence of values of probability density and this sequence of values of probability density is processed to generate the reference value $S(\vec{x}|\omega_t)$.

In particular, the reference value $S(\vec{x}|\omega_t)$ is calculated using the following equation:

$$S(\vec{x}|\omega_t) = \left| \frac{\log_{10} \prod_{i=1}^{min(r,L)} p(x_i|\omega_t)}{min(r, L)} \right|$$

where $p(x_i|\omega_t)$ represents the probability that the i-th element of flow F belongs to class $\omega_t$, that is the value given by $M_t(s_i, \Delta t_i)$. It should be noted that, in the case the value of function $p(x_i|\omega_t)$ should be equal to 0, this null value is replaced with the smallest number that can be represented with the chosen arithmetic precision: e.g. value 0 can be replaced by value $10^{-300}$, it follows that the $\log_{10}$ of this small value is equal to $-300$.

Furthermore, taking into account the fact that the method is applied starting from packet $n_0$, the reference value $S(\vec{x}|\omega_t)$ is obtained as follows:

$$S(\vec{x}|\omega_t) = \left| \frac{\log_{10} \prod_{i=n_0}^{n} p(x_i|\omega_t)}{(n - n_0 + 1)} \right|$$

where $n_0$ is the index of the first pair considered $s_i, \Delta t_i$ and represents the first packet that carries data in each SSH session.

As a matter of fact, the presence of tunneling activities over SSH is detected when the reference value $S(\vec{x}|\omega_t)$ is greater than the threshold value T. In this case, in fact, flow F will not be assigned to the predefined flow class $\omega_t$, which defines the acceptance region; it should instead assigned to the complementary class $\omega_r$, which defines the rejection region.

To compute the optimal values of the threshold T and the number no of the first packet to consider, the method described above is applied to encrypted flows of packets F that: use the SSH protocol; do not carry tunneling activities; and have not been used to generate the probability density functions.

In particular, it could be defined a maximum percentage of false negatives, i.e. those legitimate flow (non tunneling ones)

that are erroneously assigned to class $\omega_r$, e.g. 1%: this means that at least 99% of legitimate flows are correctly classified.

According to one embodiment of the present invention, the set of Z encrypted flows belonging to the predefined flow class $\omega_t$ can be divided in two subsets of flows; the first set is used to generate the probability density functions $p(x_i|\omega_t)$ and the second set is used to calculate the value of the threshold T. The value of T is chosen to correctly classify the flows in the second subset as belonging to the predefined flow class $\omega_t$ with a probability, for example, of 99%.

It should be noted that the probability density functions $p(x_i|\omega_t)$ are obtained from flows that belong to only one class, that is the predefined flow class $\omega_t$ that represent legitimate activities. According to one embodiment of the present invention, the predefined flow class $\omega_t$ can comprise a plurality of flow classes $\omega_i$ that represents both legitimate and not legitimate activities. This allows to reduce the uncertainty on the knowledge of the complementary class $\omega_r$ that defines the rejection region.

In this case, according to the method, the probability density functions $p(x_i|\omega_t)$ are generated for each class $\omega_i$ belonging to class $\omega_t$. The reference value $S(\vec{x}|\omega_t)$ is computed using the following equation:

$$S(\vec{x}|\omega_i) = \left| \frac{\log_{10} \prod_{j=n_0}^{n} p(x_j|\omega_i)}{(n-n_0+1)} \right|$$

where index i corresponds to the predefined classes that define the acceptance class $\omega_t$. The comparison step e) will hence establish if the encrypted flow of packets F is conforming to at least one of the known classes $\omega_i$ that define the flow class $\omega_t$ or to none of them; in this last case the encrypted flow of packets F is classified as belonging to the complementary class $\omega_r$ and hence it should be rejected.

To carry out the comparison the class $\omega_m$ that is used is the one that verifies the following condition:

$$S(\vec{x}|\omega_m) = \min_{\omega_i \in C} \{S(\vec{x}|\omega_i)\}$$

and flow F is assigned to this class $\omega_m$ if the following condition holds:

$\omega_m = \omega_t$ $S(\vec{x}|\omega_m) < T$ where T is the threshold computed to classify correctly a predefined percentage of flow belonging to flow class $\omega_t$, for example the 99% of them. This threshold T is computed as described above.

The present invention also relates to a computer program product loadable in the memory of a numerical processing device, comprising portions of program code which can implement the method described above when run on this processing device. The computer program for implementing the method may be stored on a computer-readable medium.

According to a further aspect, the present invention relates to an apparatus 10 for determining if the encrypted flow of packets F belongs to a predefined flow class $\omega_t$.

Figure 2:
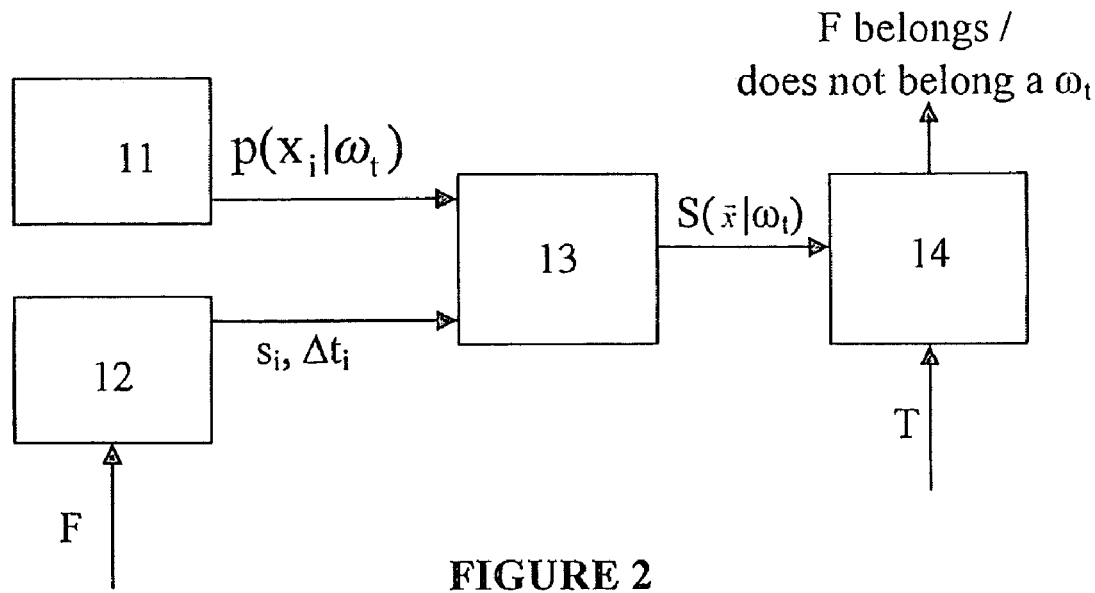
FIG. 2 is a block diagram of an apparatus to determine if an encrypted flow of packets belongs to a predefined class of flows according to the present invention.

With reference to FIG. 2, the apparatus 10 comprises storage means 11 suitable to provide for each packet position i in an ordered sequence of packets $Pkt_i$, a probability density function $p(x_i|\omega_t)$ of the values of the at least two measurable variables $(s,\Delta t)$ on a plurality of encrypted flows of packets $F_j$ belonging to the predefined class of flows $\omega_t$.

The apparatus 10 comprises the measurement means 12 able to receive as input the encrypted flow of packets F to measure the values $s_i, \Delta t_i$ of the pairs of measurable variables, for each packet $Pkt_i$ of a plurality of packets of the encrypted flow of packets F.

The apparatus 10 comprises also processing means 13 coupled with the storage means 11 and the measurement means 12 and able to:

apply the measured i-th value pair $s_i, \Delta t_i$ as arguments to the probability density function $p(x_i|\omega_t)$ that corresponds to the i-th packet; and generate a sequence of values of the probability density functions $p(\vec{x}|\omega_t)$, one for each packet $Pkt_i$; and process the sequence of values of the probability density functions $p(\vec{x}|\omega_t)$ to compute a reference value $S(\vec{x}|\omega_t)$.

In particular, the measurement means 12 and the processing means 13 are able to measure and process the data packets of the encrypted flow of packets F.

The apparatus 10 comprises also comparison means 14 coupled with the processing means 13 and adapted to compare the reference value $S(\vec{x}|\omega_t)$ with the threshold value T to determine if the encrypted flow of packets F belongs to the predefined flow class $\omega_t$.

As it can be seen from what described so far, the method and the apparatus presented in this invention allow to satisfy the expectations and to solve the impairments that have been described at the top of the present description with reference to the technical note.

In particular, the method described by the present invention allow to determine with very high accuracy if the analyzed flow is not carrying tunneling activities and with the same very high accuracy if the analyzed flow is carrying tunneling activities given that the flow is not classified as a non tunneling flow.

Obviously, a skilled technician, with the intent of satisfying any more specific requirement, could apply a number of adjustments and revisions to the method presented in this invention, which at any rate would be contained within the scope of protection defined by the following claims.

The invention claimed is:

1. Method for determining if an encrypted flow of packets (F) belongs to a predefined class of flows $(\omega_t)$, where said encrypted flow of packets (F) comprises an ordered sequence of authentication packets and data packets $(Pkt_i)$, where each packet $(Pkt_i)$ can be represented by at least two measurable variables $(s,\Delta t)$, said method comprising the steps of:
   a) providing, for each packet position (i) in an ordered sequence of packets $(Pkt_i)$, a probability density function $(p(x_i|\omega_t))$ of the values of the at least two measurable variables in a plurality of encrypted flows of packets $(F_j)$ belonging to said predefined class of flows $(\omega_t)$
   b) measuring the values $(s_i,\Delta t_i)$ of said at least two measurable variables, for each packet $(Pkt_i)$ of a plurality of packets of said encrypted flow of packets (F),
   c) applying said measured values $(s_i,\Delta t_i)$ to the probability density function $(p(x_i|\omega_t))$ of the respective packet position (i) to generate a sequence of values of probability density $(p(\vec{x}|\omega_t))$, for each packet $(Pkt_i)$ of said plurality of packets of said encrypted flow of packets (F),
   said steps b) and c) being applied to the data packets of the encrypted flow of packets (F), d) processing the sequence of values of probability density $(p(\vec{x}|\omega_t))$ to generate a reference value $(S(\vec{x}|\omega_t))$, e) comparing said reference value $(S(\vec{x}|\omega_t))$ to a threshold value (T) to determine if said encrypted flow of packets (F) belongs to said class of flows $(\omega_t)$.

2. Method according to claim 1, in which said steps b) and c) are applied to a predefined number of packets following a predefined packet $(n_0)$ chosen so that steps b) and c) are applied to the data packets of the encrypted flow of packets (F).

3. Method according to claim 1, in which said encrypted flow of packets (F) uses a transport mechanism that comprises signaling mechanisms, said steps b) and c) being applied to a predefined number of packets following a predefined packet $(n_0)$ chosen so as to avoid the application of said steps b) and c) to the packets containing exclusively signaling information.

4. Method according to claim 1, in which:

when the reference value $(S(\vec{x}|\omega_t))$ is less than the threshold value (T), the flow (F) belongs to said class $(\omega_t)$, when the reference value $(S(\vec{x}|\omega_t))$ is greater than the threshold value (T), the encrypted flow of packets (F) belongs to a class $(\omega_r)$ which is complementary to the said predefined class $(\omega_t)$.

5. Method according to claim 4, in which said predefined class of flows $(\omega_t)$ represents legitimate flows, and said complementary class $(\omega_r)$ represents non-legitimate flows.

6. Method according to claim 1, in which said step
a) of providing, for each position of packet in an ordered sequence of packets, a probability density function, comprises the steps of:
a1) providing a plurality of encrypted flows of packets belonging to said predefined class $(\omega_t)$,
a2) measuring, for each packet position in an ordered sequence of packets, the values of said at least two measurable variables in each flow of said plurality of encrypted flows of packets belonging to said predefined class $(\omega_t)$, and
a3) processing, for each packet position, said measured values to generate a probability density function for each packet position.

7. Method according to claim 6, in which said step a3) comprises, for each packet position, the steps of:
a31) processing said measured values to generate a first probability density function,
a32) applying a kernel to said first probability density function to generate a filtered function, and
a33) normalizing said filtered function to generate said probability density function.

8. Method according to claim 1, in which said step a) comprises the steps of dividing said plurality of encrypted flows belonging to said predefined class of flows $(\omega_t)$ in a first group of flows and in a second group of flows, said first group of flows identifying the plurality of encrypted flows of packets belonging to said predefined class $(\omega_t)$ of said step a) and said second group of flows being used to calculate the threshold value (T) in such a way that the flows of the second group are correctly classified as belonging to the predefined class $(\omega_t)$ with probability greater than a predefined value.

9. Method according to claim 1, in which said at least two measurable variables are the packet size (s) and the time interval between the receipt of two consecutive packets ($\Delta T$).

10. Method according to claim 1, in which said predefined class of flows $(\omega_t)$ comprises a plurality of classes of flows $(\omega_i)$, said step a) being repeated for each class of flows of said plurality of class of flows $(\omega_i)$ to generate probability density functions $(p(x_i|\omega_i))$ for each class of flows $(\omega_i)$, said step e) comparing the reference value $(S(\vec{x}|\omega_t))$ with the threshold value (T) to determine if said encrypted flow of packets (F) belongs to at least one of the classes of flows $(\omega_i)$.

11. Computer program product directly loadable in the memory of a numerical processing device, comprising portions of program code which can achieve the method in accordance with claim 1 when made to run on said processing device.

12. Apparatus (10) for determining if an encrypted flow of packets (F) belongs to a predefined class of flows $(\omega_t)$, said encrypted flow of packets (F) comprising an ordered sequence of authentication packets and data packets ($Pkt_i$), each packet ($Pkt_i$) being representable by at least two measurable variables (s,$\Delta t$), said apparatus (10) being characterized by the fact that it comprises:

storage means (11) capable of providing, for each packet position (i) in an ordered sequence of packets ($Pkt_i$), a probability density function $(p(x_i|\omega_t))$ of the values of said at least two measurable variables in a plurality of encrypted flows of packets ($F_j$) belonging to said predefined class of flows $(\omega_t)$, measurement means (12) capable of receiving in input said encrypted flow of packets (F) to measure the values ($s_i,\Delta t_i$) of said at least two measurable variables, for each packet ($Pkt_i$) of a plurality of packets of said encrypted flow of packets (F), processing means (13) coupled to said storage means (11) and to said measurement means (12) and capable of:
applying said measured values ($s_i,\Delta t_i$) to the probability density function $(p(x_i|\omega_t))$ of the respective packet position (i) to generate a sequence of values of probability density $(p(\vec{x}|\omega_t))$, for each packet ($Pkt_i$) of said plurality of packets of said encrypted flow of packets (F), and processing the sequence of values of probability density $(p(\vec{x}|\omega_t))$ to generate a reference value $(S(\vec{x}|\omega_t))$, said measurement means (12) and said processing means (13) measuring and processing the data packets of the encrypted flow of packets (F), comparison means (14) coupled to said processing means (13) and capable of comparing said reference value $(S(\vec{x}|\omega_t))$ to a threshold value (T) to determine if an encrypted flow of packets (F) belongs to said predefined class of flows $(\omega_t)$.

* * * * *